United States Patent [19]
Brunty

[11] 3,816,918
[45] June 18, 1974

[54] BREAD MAKING ACCESSORY

[76] Inventor: Fred Brunty, 404 College Ave., Bluefield, W. Va. 24701

[22] Filed: May 25, 1973

[21] Appl. No.: 364,096

[52] U.S. Cl................... 30/114, 30/305, 30/320
[51] Int. Cl.............................................. A21c 5/00
[58] Field of Search .............. 30/114, 304, 305, 320

[56] References Cited
UNITED STATES PATENTS

| 1,076,509 | 10/1913 | Mitschler | 30/114 |
| 1,706,934 | 3/1929 | Miles et al. | 30/114 |
| 2,878,564 | 3/1959 | Strate | 30/114 X |
| 3,010,379 | 8/1935 | Scalise | 30/114 |

*Primary Examiner*—Al Lawrence Smith
*Assistant Examiner*—J. T. Zatarga
*Attorney, Agent, or Firm*—John F. McClellan, Sr., Esq.

[57] ABSTRACT

A bread making, manually operated accessory for single operation dough severing and spacing in a variety of sizes and pan configurations; a pair of rectangular blades are attached for relatively slidable motion with the edges substantially coincident by a pair of resilient tubular telescoping flanges integral with the respective blades on the dies opposite the blade cutting edges and spaced and clamped to spring the cutting edges together, circular handles with circular caps affixed at the ends of the blades perpendicular to the blade length provide for secure free swivelling, length changing and opening of the device.

8 Claims, 6 Drawing Figures

PATENTED JUN 18 1974 3,816,918
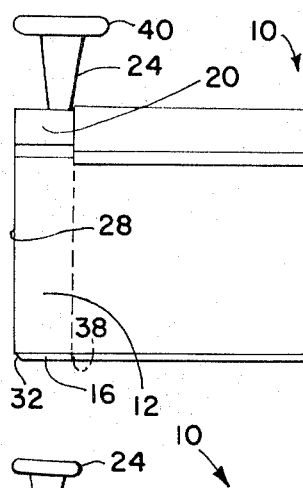
FIG.1
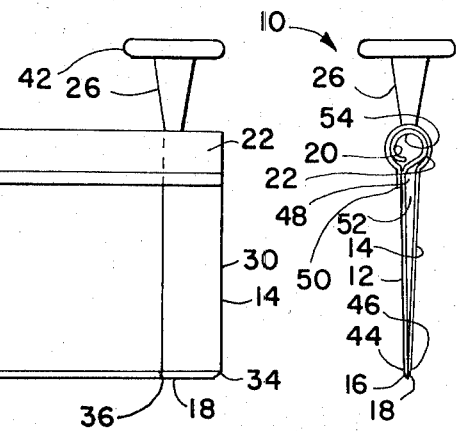
FIG.2
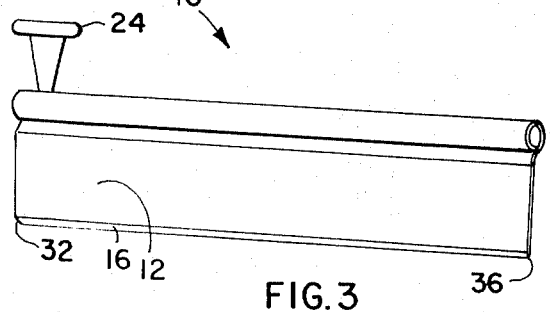
FIG.3
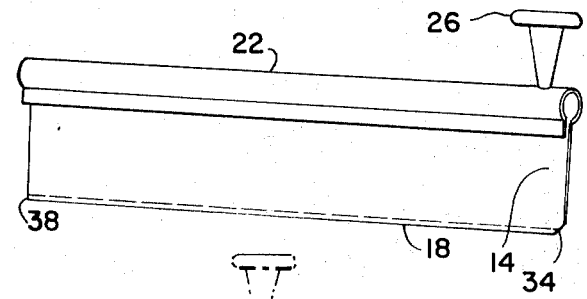
FIG.4
FIG.5
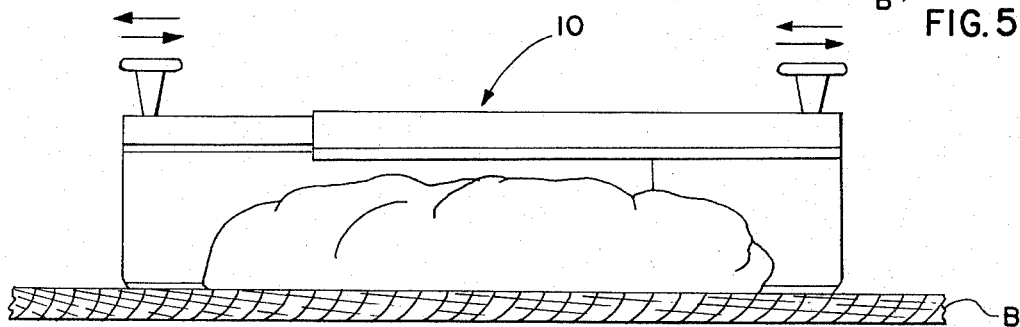
FIG.6

BREAD MAKING ACCESSORY

This invention relates generally to kitchen utensils and specifically to an extensible-length baker's tool for one-step severing and spacing of bread dough and the like.

In the prior art, various general purpose tools for the purpose have been used, including kitchen knives, spatulas and the like. U.S. Pat. No. 3,363,589 granted on Jan. 16, 1968 to A. C. Addington exemplifies a special-purpose tool in the form of a fixed-size grid "Dough Divider."

However, the problem which the present invention solves presents a number of difficulties such as variances in dough texture and depth and container size variations which to the present time have prevented any prior-art device from being entirely satisfactory, and becoming a standard item of commerce for the purpose described.

Consequently in home kitchens, commercial kitchens and institutional kitchens the mechanical awkwardness of separating masses of dough into individual rolls and the like tends to discourage the in-house preparation and serving of such foods.

A principal object of the present invention, therefore, is to provide an easy one-step cutter which makes roll-making and the like substantially easier, quicker and more economical, and which therefore will encourage such production in homes, as well as restaurants and other institutions.

Other objects are to provide a device as described which is instantly adjustable for use with various container sizes and shapes in both horizontal and vertical dimensions, which is safe and comfortable to handle, which can be used both to shear apart and to press apart dough masses, and which is adaptable to use both as an assembly and in separate parts with one-handed operation.

Further objects are to provide a device as described which is sanitary in use, which is easy and safe to inspect and to clean, which is attractive in appearance, durable in heaviest use, and which is economical to manufacture, store, ship, and display for sale.

In brief summary, the invention includes a pair of blades with substantially coincident cutting edges, each blade having a resiliently openable tubular connecting flange along the side opposite the edge, one of the flanges being offset to spring the blades together when the flanges telescope connecting the blades, and a circular handle on each blade to permit free swiveling of the device in the hands of the user.

The above and other objects and advantages of the present invention will become more readily apparent on examination of the following description, including the drawings in which, like numerals indicating like parts:

FIG. 1 is a side elevation of the invention assembled;

FIG. 2 is an end elevation of the FIG. 1 view;

FIG. 3 is an isometric view of the component parts of the invention disassembled in line;

FIG. 4 is an elevation section of the invention in use with a tapered-side pan;

FIG. 5 is an end elevation of the invention in use pushing apart dough sections cut; and FIG. 6 is a side elevation of the invention with the parts being relatively oscillated for slicing frozen dough or the like.

FIG. 1 illustrates the general construction of the invention 10 which comprises a first rectangular blade 12, a second rectangular blade 14, parallel nearly-coincident cutting edges 16, 18, on the respective blades, inter-telescoping connecting structure 20, 22 along the edges of the respective blades opposite the cutting edges, and a handle 24, 26 at the free end 28, 30 of each blade perpendicularly affixed to the connecting structure in the plane of the blades.

The free ends of the blades have rounded corners 32, 34 at the cutting edge; the corresponding corners 36, 38 of the inner ends of the cutting edges are not rounded.

The handles 24, 26 are circular section bodies with circular-shape protruding tops, 40, 42 providing for the user with grease or flour covered hands to hold one handle in each hand and manipulate the device without slipping, rapidly rotating it from one pan-fitting angle to another and sliding it from one length to another as required.

FIG. 2 shows the relation of the blade connection structure and the cutting edges of the blades. At the cutting edge, each blade has a bevel along one face, the outer face, as at 44 and 46; the inner faces of the cutting edges are not bevelled. This arrangement permits the two cutting edges to fit closely together in substantial coincidence, producing effectively a single variable length cutting edge.

To maintain the edges tightly together, the upper end of each blade in end view has the general form of a question mark or of an apertured flange having a shank, the flat portion of each blade forming the shank and the upper portion forming a cylindrically tubular flange or loop. The tubular loop 20 of blade 12 is relatively smaller and has a tangentially disposed portion 48 offsetting the center of the loop from the plane of the shank or flat portion of the blade.

The tubular loop 22 of the other blade 14 is similar but larger in diameter and not offset in the same manner, and preferably has a terminal flange 50 turned outward toward the flat portion of the blade.

At least one of the tubular loops is resilient and for stress concentration avoidance preferably both of the tubular loops are resilient.

On assembly as indicated the two tubular portions axially slide or telescope together with the terminal flange 50 of blade 12 clamping against blade 14 adjacent the tangentially disposed portion 48.

This arrangement prevents the terminal edge of the outer loop from scoring the periphery of the inner loop when slid along it during telescoping, preserving the ability of the tubular portion to rotate smoothly and relatively freely with respect to each other when assembled, for purposes described later. The inner loop tangentially disposed portion 48 creates a space 52 between the upper flat portion of the blades, developing the clamping pressure of the outer loop 22 and bringing the blade cutting edges together at an acute angle which in conjunction with the outer face bevels 44, 46 tends to keep material from penetrating the crack between the blades.

A screw 54 or a rivet or an upset extension protruding through a suitable hole in the tubular portion may be used to secure each handle. Alternatively, the handles may be welded or cemented in place. Particularly if cast or molded construction is used, since the design may be embodied in metal or in a hard, resilient plastic such as solid polystyrene, the handles may be integrally formed.

The location of the handles at the ends of the blades makes correct assembly automatic as when the device is disassembled for cleaning, for use of the two blades separately, or for connection of one of the blades to a longer blade to extend the cutting length.

FIG. 3 shows the blades separated. It can be seen that the rounded, tubular portions are convenient for gripping for one-hand use or for safely pressing on if desired to apply more force in the middle in parting very tough masses of material.

FIG. 4 shows successive positions a, b, c, through which the invention 10 may be passed in cleanly parting dough D or dough-like material contained in a tapered-side pan P. The user simply presses down and at the same time progressively telescopes the length of the device inward as the cut proceeds, allowing the rounded corners 32, 34 of the cutting edge to slide down the tapered sides of the pan. To visualize the full flexibility and convenience of the invention, the pan P may be considered as being of the common variety which is circular as well as having tapered sides, requiring length changes both between strokes and during strokes.

FIG. 5, an end view, illustrates a further useful and novel advantage of the structure of the invention. When a complete separation is to be made between portions $D_1$, $D_2$ of severed dough the severed portions can be thrust apart in the same quick one-step cutting and spacing operation by springing the blades 12, 14 apart when in contact with the cutting board B or pan bottom through rotation of the handles 24, 26 of the device in the direction indicated by the arrows.

FIG. 6 illustrates an additional co-action of the structure of the invention: in severing particularly tenacious dough such as frozen dough, the blades can be relatively extended and retracted, safely shearing through the material on repeated oscillation.

In conclusion, it can be seen that the invention collapses together for compact storage, extends in infinitely variable increments to fit various sizes and contours of containers, and provides safe, effective modes of cutting and parting in a manner not heretofore known in the art.

Obviously, many modifications and variations of the present invention are possible in light of the above teachings. It is, therefore, to be understood that within the scope of the appended claims the invention may be practiced otherwise than as specifically described.

What is claimed and desired to be secured by United States letters Patent is:

1. A bread making accessory comprising: means for one-operation slicing and spacing apart portions of dough portions, including: first and second flat rectangular blades having respective cutting edges, means for aligning and retaining said cutting edges in substantial coincidence comprising an apertured flange on the edge of the first blade opposite the cutting edge thereof and a flange on the edge of the second blade opposite the cutting edge thereof, at least one of said flanges being resilient, the flange of the first blade being proportioned for resiliently telescoping over the apertured flange of the second blade.

2. A bread making accessory as recited in claim 1, wherein said first blade apertured flange comprises a tubular loop extending substantially the length of said first blade.

3. A bread making accessory as recited in claim 2, wherein said second blade flange comprises a tubular loop extending substantially the length of the second blade and having a tangentially disposed portion offsetting the center of said tubular loop of the second blade from the plane of said blade, thereby on assembly spacing said first and second blades apart away from the cutting edges thereof and forcing said first and second blades into substantial co-incidence at the cutting edges.

4. A bread making accessory as recited in claim 3, wherein the first blade tubular loop has a terminal flange thereon extending toward the blade thereof in position to bear on the upper portion of the second blade adjacent said tangentially disposed portion thereof on assembly of said blades together.

5. A bread making accessory as recited in claim 3, wherein each said blade cutting edge has a bevel on the outer face thereof.

6. A bread making accessory as recited in claim 5, wherein each said blade has a projecting free end on assembly of the blades together, and wherein the free ends of the blades have rounded corners at the cutting edges.

7. A bread making accessory as recited in claim 6, and a handle at the free end of each blade affixed perpendicular to the axis of the tubular loop thereof substantially in the plane of the blade.

8. A bread making accessory as recited in claim 7, wherein each handle comprises a circular-section body having a protruding circular cap.

* * * * *